(12) United States Patent
Lin

(10) Patent No.: US 12,444,907 B2
(45) Date of Patent: Oct. 14, 2025

(54) LIGHT-EMITTING DEVICE

(71) Applicant: EPISTAR CORPORATION, Hsinchu (TW)

(72) Inventor: Yung-Hsiang Lin, Hsinchu (TW)

(73) Assignee: EPISTAR CORPORATION, Hsinchu (TW)

( * ) Notice: Subject to any disclaimer, the term of this patent is extended or adjusted under 35 U.S.C. 154(b) by 770 days.

(21) Appl. No.: 17/722,804

(22) Filed: Apr. 18, 2022

(65) Prior Publication Data

US 2023/0335975 A1    Oct. 19, 2023

(51) Int. Cl.
*H01S 5/20* (2006.01)
*H01S 5/22* (2006.01)
(Continued)

(52) U.S. Cl.
CPC .............. *H01S 5/2054* (2013.01); *H01S 5/22* (2013.01); *H01S 5/3215* (2013.01);
(Continued)

(58) Field of Classification Search
CPC .. H01S 5/34333; H01S 5/3215; H01S 5/3218; H01S 5/3406; H01S 5/3213; H10H 20/815
See application file for complete search history.

(56) References Cited

U.S. PATENT DOCUMENTS 5,670,798 A * 9/1997 Schetzina ............ H10H 20/832
                                                    257/E29.081
6,309,459 B1 * 10/2001 Yuge .................. H01L 21/0237
                                                    257/E21.108
(Continued)

FOREIGN PATENT DOCUMENTS

DE    102017122032 A1 *  3/2019 ........... H01S 5/3063
WO    WO-0106608 A1 *    1/2001 ............. B82Y 20/00
(Continued)

*Primary Examiner* — Joshua King
(74) *Attorney, Agent, or Firm* — Patterson + Sheridan, LLP

(57) ABSTRACT

A light-emitting device is provided. An active layer is disposed on a substrate and between the first semiconductor layer and the second semiconductor layer. The first aluminum-containing semiconductor layer is disposed between the substrate and the first semiconductor layer, and a first aluminum composition ratio of the first aluminum-containing semiconductor layer is greater than that of the first semiconductor layer. The second aluminum-containing semiconductor layer is disposed between the first aluminum-containing semiconductor layer and the first semiconductor layer, and a second aluminum composition ratio of the second aluminum-containing semiconductor layer is greater than that of the first semiconductor layer. The stack structure is disposed between the first and second aluminum-containing semiconductor layers, and the stack structure includes first, second, and third indium-containing semiconductor layers stacked in sequence. The first, second, and third indium-containing semiconductor layers are made of $In_{a1}Al_{b1}Ga_{1-a1-b1}N$ ($0<a1+b1<1$), $In_{a2}Al_{b2}Ga_{1-a2-b2}N$ ($0<a2+b2<1$), and $In_{a3}Al_{b3}Ga_{1-a3-b3}N$ ($0<a3+b3<1$), respectively, and $0<a3 \leq a1<a2$.

20 Claims, 10 Drawing Sheets

(51) Int. Cl.
*H01S 5/32* (2006.01)
*H01S 5/343* (2006.01)

(52) U.S. Cl.
CPC ............ *H01S 5/3218* (2013.01); *H01S 5/343* (2013.01); *H01S 2301/173* (2013.01)

(56) References Cited

U.S. PATENT DOCUMENTS

| | | | | |
|---|---|---|---|---|
| 6,829,273 | B2 * | 12/2004 | Amano | ............... H01S 5/34333 372/45.01 |
| 2004/0051107 | A1 * | 3/2004 | Nagahama | ............ H01S 5/3409 257/79 |
| 2004/0125839 | A1 * | 7/2004 | Lee | ........................ B82Y 20/00 372/45.01 |
| 2010/0189148 | A1 * | 7/2010 | Kyono | ................... B82Y 20/00 372/45.01 |
| 2011/0013656 | A1 * | 1/2011 | Akita | ................. H01S 5/34333 372/45.01 |
| 2011/0168977 | A1 * | 7/2011 | Eichler | ............... H01S 5/34333 257/E33.027 |
| 2012/0261687 | A1 * | 10/2012 | Shim | ................... H10H 20/811 257/97 |

FOREIGN PATENT DOCUMENTS

| | | | | |
|---|---|---|---|---|
| WO | WO-2010051537 | A1 * | 5/2010 | ............ H10H 20/825 |
| WO | WO-2010084697 | A1 * | 7/2010 | ........ H01L 21/02573 |

* cited by examiner

LIGHT-EMITTING DEVICE

TECHNICAL FIELD

The application relates to a light-emitting device, and more particularly, to a light-emitting device having a buffer layer.

DESCRIPTION OF THE BACKGROUND ART

Light-emitting devices, such as light-emitting diode (LED), infrared-emitting diodes (IRED), edge-emitting laser diodes (LD) and vertical-cavity surface-emitting lasers (VC-SEL), are solid-state semiconductor devices having a p-n junction formed between a p-type semiconductor layer and an n-type semiconductor layer. When imposing a certain level of forward voltage to an LED, holes from the p-type semiconductor layer can radiatively recombine with electrons from the n-type semiconductor layer to release light. The region where the recombination occurs is generally called a light-emitting region or an active layer.

Edge-emitting laser diode is a type of laser diodes that is capable of emitting light with high intensity and high coherency. Generally, an edge-emitting laser diode includes not only the active layer but also guide layers and/or cladding layers disposed on opposite sides of the active layer. Since the refractive indexes of the guide layers and cladding layers are less than the refractive index of the active layer, the light generated from the active layer can be confined by the guide layers and cladding layers and emitted out of the laser diode only from a lateral surface of the active layer.

In order to perform the required light confining effect, the thickness of each of the guide layer and the cladding layer often needs to be large enough, such as over 150 nm. However, since the lattice constant and the composition of the guide layer are different from those of the adjacent cladding layer, stress and/or strain are accumulated in the guide layer and the cladding layer, which in turn causes defects in the guide layer.

Therefore, there is a need to provide an improved light-emitting device without the drawbacks described above.

SUMMARY OF THE APPLICATION

Therefore, a light-emitting device which can alleviate or solve the drawbacks of the prior art is provided according to the present disclosure.

In some embodiments of the present disclosure, a light-emitting device includes a substrate, a first semiconductor layer, a second semiconductor layer, an active layer, a first aluminum-containing semiconductor layer, a second aluminum-containing semiconductor layer, and a stack structure. The first semiconductor layer and the second semiconductor layer are disposed on the substrate, and the active layer is disposed between the first semiconductor layer and the second semiconductor layer. The first aluminum-containing semiconductor layer is disposed between the substrate and the first semiconductor layer, and a first aluminum composition ratio of the first aluminum-containing semiconductor layer is greater than an aluminum composition ratio of the first semiconductor layer. The second aluminum-containing semiconductor layer is disposed between the first aluminum-containing semiconductor layer and the first semiconductor layer, and a second aluminum composition ratio of the second aluminum-containing semiconductor layer is greater than the aluminum composition ratio of the first semiconductor layer. The stack structure is disposed between the first aluminum-containing semiconductor layer and the second aluminum-containing semiconductor layer, and the stack structure includes first, second, and third indium-containing semiconductor layers stacked in sequence. The first, second, and third indium-containing semiconductor layers are made of $In_{a1}Al_{b1}Ga_{1-a1-b1}N$ (0<a1+b1<1), $In_{a2}Al_{b2}Ga_{1-a2-b2}N$ (0<a2+b2<1), and $In_{a3}Al_{b3}Ga_{1-a3-b3}N$ (0<a3+b3<1), respectively, and 0<a3<a1<a2 or 0<a1<a3<a2.

BRIEF DESCRIPTION OF THE DRAWINGS

Aspects of the present disclosure are best understood from the following detailed description when read with the accompanying figures. It is noted that, in accordance with the standard practice in the industry, various features may not be drawn to scale. In fact, the dimensions of the various features may be arbitrarily increased or reduced for clarity of discussion.

DETAILED DESCRIPTION

Figure 1:
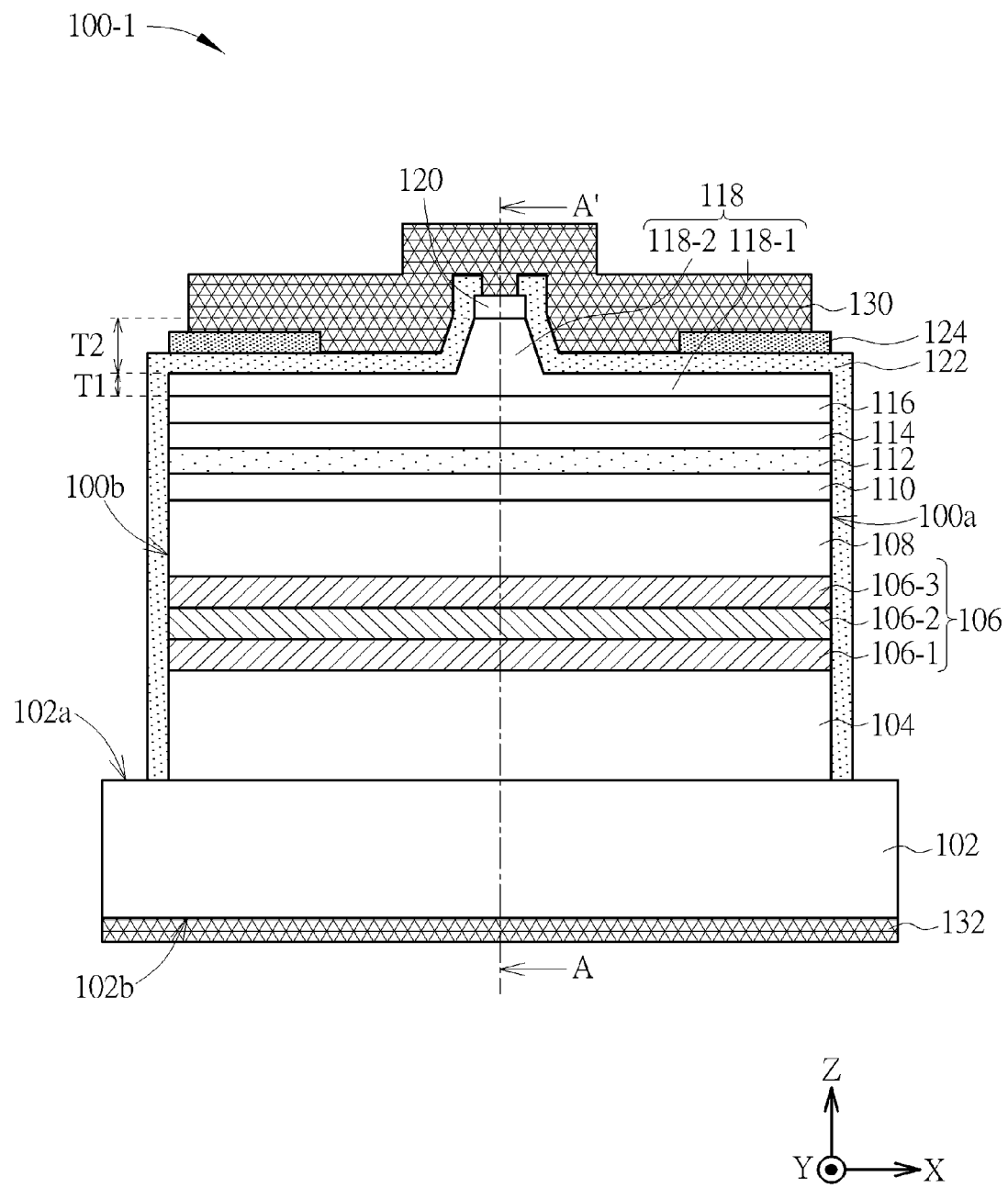
FIG. 1 is a schematic cross-sectional view of a light-emitting device according to some embodiments of the present disclosure.

The embodiments of the present disclosure will be described in detail and drawn in the drawings, and the same or similar parts will appear in the drawings and descriptions with the same numbers. The embodiments of the present disclosure can be understood together with the drawings, and the drawings are also considered as a part of the description of the embodiments of the present disclosure. It should be understood that the drawings are not drawn with the actual device and component ratios. The shapes and thicknesses of the embodiments may be exaggerated in the drawings so as to clearly show the features of the embodiments of the present disclosure.

In addition, certain terms such as "below", "above", "under", "on", "lower" or "bottom", and "upper" or "top" may be used in embodiments to describe the relative relationship of one device to another device of a drawing. It can be understood that if the illustrated device is turned upside down, the components described on the "below", "under", and "lower" sides will become the components on the "above", "on", and "upper" sides.

Terms such as "first", "second", and "third" and so on may be used in embodiments to describe various devices, components, regions, layers, and/or portions, but should not be limited by these terms, these terms are only used for distinguishing between different devices, components, regions, layers, and/or portions. Accordingly, a first device, component, region, layer, and/or portion discussed below may be referred to as a second device, component, region, layer, and/or portion without departing from the teachings of the embodiments of the present disclosure.

Although the disclosure is described with respect to specific embodiments, the principles of the invention, as defined by the claims appended herein, can obviously be applied beyond the specifically described embodiments of the invention described herein. Moreover, in the description of the present disclosure, certain details have been left out in order to not obscure the inventive aspects of the disclosure. The details left out are within the knowledge of a person having ordinary skill in the art.

FIG. 1 is a schematic cross-sectional view of a light-emitting device according to some embodiments of the present disclosure. Referring to FIG. 1, a light-emitting device 100-1, such as a laser diode, includes a substrate 102, a first aluminum-containing semiconductor layer 104, a stack structure 106, a second aluminum-containing semiconductor layer 108, a first semiconductor layer 110, an active layer 112, and a second semiconductor layer 114. The substrate 102 includes two opposite surfaces, such as a first surface 102a and a second surface 102b. The first aluminum-containing semiconductor layer 104, the stack structure 106, the second aluminum-containing semiconductor layer 108, the first semiconductor layer 110, the active layer 112, and the second semiconductor layer 114 are stacked on the first surface 102a of the substrate 102 in sequence along a z-direction.

The first aluminum-containing semiconductor layer 104 is disposed between the substrate 102 and the first semiconductor layer 110, and the first aluminum-containing semiconductor layer 104 has a first aluminum composition ratio. The second aluminum-containing semiconductor layer 108 is disposed between the first aluminum-containing semiconductor layer 104 and the first semiconductor layer 110, and the second aluminum-containing semiconductor layer 108 has a second aluminum composition ratio. The first semiconductor layer 110 and the second semiconductor layer 114 are disposed on the substrate 102, and the active layer 112 is disposed between the first semiconductor layer 110 and the second semiconductor layer 114. The first semiconductor layer 110 and the second semiconductor layer 114 have the same or different aluminum composition ratios. In one embodiment, the first semiconductor layer 110 and the second semiconductor layer 114 have the same composition ratio. In one embodiment, the first semiconductor layer 110 and the second semiconductor layer 114 have the same thickness. In one embodiment, the first aluminum composition ratio and the second aluminum composition ratio are both greater than the aluminum composition ratio of the first semiconductor layer 110. In one embodiment, the second aluminum composition ratio is greater than the first aluminum composition ratio.

The stack structure 106 is a multi-layered structure disposed between the first aluminum-containing semiconductor layer 104 and the second aluminum-containing semiconductor layer 108, and the stack structure 106 includes multiple indium-containing semiconductor layers. In the present embodiment, the stack structure 106 includes a first indium-containing semiconductor layer 106-1, a second indium-containing semiconductor layer 106-2, and a third indium-containing semiconductor layer 106-3 stacked in sequence. In one embodiment, a thickness of the stack structure 106 is less than a thickness of the first aluminum-containing semiconductor layer 104 and a thickness of the second aluminum-containing semiconductor layer 108. For example, the thickness of the stack structure 106 is 0.05~0.5 times, such as 0.1~0.3 times the thickness of the first aluminum-containing semiconductor layer 104 or the thickness of the second aluminum-containing semiconductor layer 108.

The first indium-containing semiconductor layer 106-1, the second indium-containing semiconductor layer 106-2, and the third indium-containing semiconductor layer 106-3 can have different compositions and thicknesses from each other. Specifically, the first indium-containing semiconductor layer 106-1 contains $In_{a1}Al_{b1}Ga_{1-a1-b1}N$ (0<a1+b1<1), the second indium-containing semiconductor layer 106-2 contains $In_{a2}Al_{b2}Ga_{1-a2-b2}N$ (0<a2+b2<1), and the third indium-containing semiconductor layer 106-3 contains $In_{a3}Al_{b3}Ga_{1-a3-b3}N$ (0<a3+b3<1) wherein a1 represents the first indium composition ratio in the first indium-containing semiconductor layer 106-1, a2 represents the second indium composition ratio in the second indium-containing semiconductor layer 106-2, and a3 represents the third indium composition ratio in the third indium-containing semiconductor layer 106-3, and a1, a2, and a3 satisfy 0<a3<a1<a2 or 0<a1<a3<a2. Thus, the second indium composition ratio a2 is greater than the first indium composition ratio a1 and the third indium composition ratio a3. In some embodiments, the second indium composition ratio a2 is in the range of 0.002~0.2, such as 0.005~0.1 or 0.01~0.05.

A thickness (i.e. a second thickness) of the second indium-containing semiconductor layer 106-2 is respectively greater than a thickness (i.e. a first thickness) of the first indium-containing semiconductor layer 106-1 and a thickness (i.e. a third thickness) of the third indium-containing semiconductor layer 106-3. In some embodiments, the second thickness of the second indium-containing semiconductor layer 106-2 is respectively 4 to 10 times greater than the first thickness of the first indium-containing semiconductor layer 106-1 and the third thickness of the third indium-containing semiconductor layer 106-3. The second thickness is between 60 nm and 600 nm, for example, between 80 nm and 300 nm. The first thickness and the third thickness are respectively between 0.5 nm and 50 nm, for example, between 1 nm and 30 nm.

According to some embodiments of the present disclosure, the active layer 112 is a light-emitting structure capable of radiating light out of the light-emitting device 100-1 along a Y-direction. Each of the first semiconductor layer 110 and the second semiconductor layer 114 has a refractive index (or average refractive index) lower than the refractive index (or average refractive index) of the active layer 112. Thus, the first and second semiconductor layers 110, 114 can act as light guide layers used to confine the light generated from the active layer 112. The second aluminum-containing semiconductor layer 108 disposed under the first semiconductor layer 110 has a refractive index lower than the refractive index of the first semiconductor layer 110. Thus, the second aluminum-containing semiconductor layer 108 can act as a cladding layer to confine carriers such as electrons and also can be used to reflect the light passing through the first semiconductor layer 110 toward the second aluminum-containing semiconductor layer 108.

According to some embodiments of the present disclosure, a lattice constant of the second aluminum-containing semiconductor layer 108 is less than a lattice constant of the first semiconductor layer 110. For example, the lattice constant of the second aluminum-containing semiconductor layer 108 is at least 2% less than the lattice constant of the first semiconductor layer 110. Besides, the thickness (i.e.

dimension along the z-direction) of the first semiconductor layer 110 is greater than 100 nm, such as 150 nm or above, but lower than 600 nm, for example, lower than 400 nm. The first aluminum-containing semiconductor layer 104 and/or the stack structure 106, which are disposed between the substrate 102 and the second aluminum-containing semiconductor layer 108, serve as the stress buffer layer, to reduce the stress accumulated in the first semiconductor layer 110 and prevent surface irregularities, such as pits or other defects, from forming on the top surface of the first semiconductor layer 110. For example, the first aluminum-containing semiconductor layer 104 can be a semiconductor layer capable of generating tensile stress to the substrate 102, and the stack structure 106 can be a multiple-layered structure capable of generating compressive stress to the substrate 102. In some embodiments, the lattice constant of the first aluminum-containing semiconductor layer 104 is 2% less than the lattice constant of any one of the layers, such as the first indium-containing semiconductor layer 106-1, the second indium-containing semiconductor layer 106-2, or the third indium-containing semiconductor layer 106-3, in the stack structure 106. Besides, the lattice constant of the first and third indium-containing semiconductor layers 106-1, 106-3 are less than the lattice constant of the second indium-containing semiconductor layer 106-2.

Therefore, by disposing the stack structure 106 between the first aluminum-containing semiconductor layer 104 and the second aluminum-containing semiconductor layer 108, fewer or no surface irregularity is observed on the top surface of the first semiconductor layer 110.

Moreover, in some embodiments, a lattice constant of the second indium-containing semiconductor layer 106-2 is greater than a lattice constant of each of the first aluminum-containing semiconductor layer 104 and the second aluminum-containing semiconductor layer 108. Also, in some embodiments, a lattice constant of the second indium-containing semiconductor layer 106-2 is greater than a lattice constant of each of the first indium-containing semiconductor layer 106-1 and the third indium-containing semiconductor layer 106-3. Besides, in some embodiments, a lattice constant of the second indium-containing semiconductor layer 106-2 is greater than a lattice constant of the substrate 102. For these embodiments, less stress and strain are accumulated in the first semiconductor layer 110, which means fewer or no surface irregularity is observed on the top surface of the first semiconductor layer 110.

The stack structure 106 is not limited to a structure including only three layers. In order to properly buffer the stress generated from the layers below or above the stack structure 106, the stack structure 106 including more than three layers can be provided in some embodiments of the present disclosure. For example, the stack structure 106 can further include an additional fourth indium-containing semiconductor layer (not shown) disposed between the first indium-containing semiconductor layer 106-1 and the second indium-containing semiconductor layer 106-2. The fourth indium-containing semiconductor layer can be made of $In_{a4}Al_{b4}Ga_{1-a4-b4}N$ (0<a4+b4<1), and the equation a1<a4<a2 is satisfied. Besides, a thickness of the fourth indium-containing semiconductor layer can be between thicknesses of the first and second indium-containing semiconductor layers 106-1, 106-2. Analogously, the stack structure 106 can further include an additional fifth indium-containing semiconductor layer (not shown) disposed between the second indium-containing semiconductor layer 106-2 and the third indium-containing semiconductor layer 106-3. The fifth indium-containing semiconductor layer can be made of $In_{a5}Al_{b5}Ga_{1-a5-b5}N$ (0<a5+b5<1), and the equation a3<a5<a2 is satisfied. Besides, a thickness of the fifth indium-containing semiconductor layer can be between thicknesses of the second and third indium-containing semiconductor layers 106-2, 106-3.

In addition to the layers and the components described above, the light-emitting device 100-1 can further include other layers and components in some embodiments of the present disclosure. The additional layers and components are described in detail as follows.

Referring to FIG. 1, a first electrode 132 such as an n-side electrode can be disposed on the second surface 102b of the substrate 102. The first electrode 132 can be coupled to a negative voltage during the operation of the light-emitting device 100-1. An electron blocking layer (EBL) 116 used to suppress electron leakage can be disposed on the second semiconductor layer 114.

A third aluminum-containing semiconductor layer 118 acting as a cladding layer to confine carriers such as holes can be disposed on the second semiconductor layer 114. The refractive index of the third aluminum-containing semiconductor layer 118 can be lower than the refractive indexes of the underlying second semiconductor layer 114. In order to increase the proportion of fundamental mode to the lateral mode of the emitted radiation by the light-emitting device 100-1, the third aluminum-containing semiconductor layer 118 can be shaped to include a film portion 118-1 and a ridge-shaped portion 118-2, and the film portion 118-1 can be disposed under the ridge-shaped portion 118-2 and at two sides of the ridge-shaped portion 118-2. Besides, the ridge-shaped portion 118-2 can be a component used to construct a resonant cavity in the light-emitting device 100-1.

A contact layer 120 such as a p-side semiconductor contact layer used to form ohmic contact with the p-side electrode 130 can be disposed on the top surface of the ridge-shaped portion 118-2 of the third aluminum-containing semiconductor layer 118. A transparent conductive layer (not shown) can be optionally disposed between the contact layer 120 and the p-side electrode 130 to further spread the current across the light-emitting device 100-1. A first insulating layer 122 used to protect the sidewalls of the light-emitting device 100-1 can be formed on two opposite sidewalls, such as a first sidewall 100a and a second sidewall 100b, of the light-emitting device 100-1, and continuously extend to the upper surface of the film portion 118-1, two opposite sidewalls of the ridge portion 118-1 and a portion of the upper surface of the contact layer 120. A second electrode 130 such as a p-side electrode can be electrically connected to the contact layer 120, and the second electrode 130 can be coupled to a positive voltage during the operation of the light-emitting device 100-1. A second insulating layer 124 can be disposed on the first insulating layer 122 at two opposite sides of the ridge-shaped portion 118-2 to reduce the surface undulation of the second electrode 130 so as to improve the bonding yield when the light-emitting device 100-1 is flipped and bonded to the sub-mount 408 by the second electrode 130 illustrated in FIG. 10. The second insulating layer 124 is also used to prevent unnecessary electrical connection between the second electrode 130 and the third aluminum-containing semiconductor layer 118. In an embodiment, when the ridge-shaped portion 118-2 including an elevated height T2 with respect to the top surface of the film portion 118-1 is less than 60 μm such as less than 40 μm, the second insulating layer 124 can be omitted.

Figure 2:
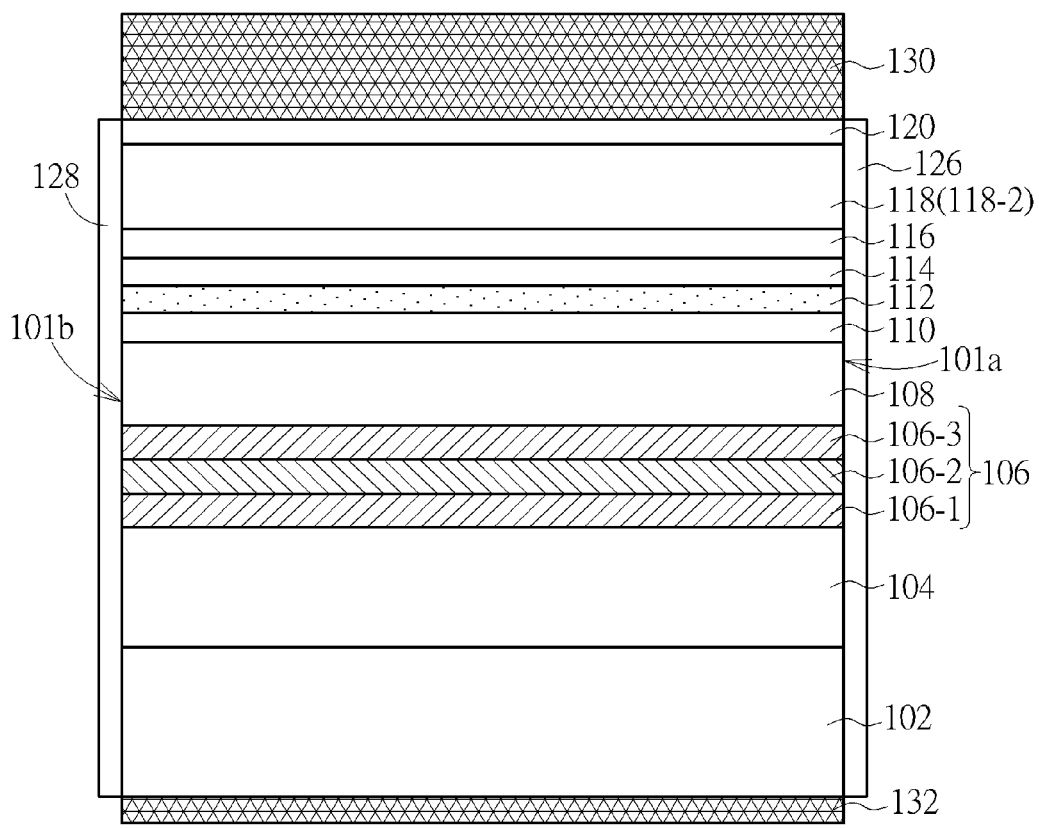
FIG. 2 is a schematic cross-sectional view of a light-emitting device taken along line AA' of FIG. 1 according to some embodiments of the present disclosure.

FIG. 2 is a schematic cross-sectional view of a light-emitting device taken along line A-A' of FIG. 1 according to some embodiments of the present disclosure. Referring to FIG. 2, in the cross-sectional view shown in FIG. 2, all layers shown in FIG. 2 have the same width and align to each other such that a continuously smooth plane is formed on both sidewalls 101a and 101b. Besides, a low-reflective layer 126 and a high-reflective (HR) layer 128 can be disposed on two sidewalls 101a, 101b of the light-emitting device 100-1, respectively. The two sidewalls 101a, 101b covering with the low-reflective layer 126 and the high-reflective layer 128 can constitute a resonant cavity in light-emitting device 100-1 for generating radiation with the same phase, coherent light.

The high-reflective layer 128 can be a multi-layered film containing dielectric material. The dielectric material contains the oxide, nitride, or oxynitride of aluminum (Al), silicon (Si), niobium (Nb), titanium (Ti), zirconium (Zr), hafnium (Hf), tantalum (Ta), zinc (Zn), yttrium (Y), gallium (Ga), or magnesium (Mg), but not limited thereto. The low-reflective layer 126 has a reflectivity of more than 85% for the radiation emitted by the active layer 112, and may contain a metal oxide such as $Al_2O_3$, or a metal oxynitride such as $AlNO_x$. The high-reflective layer 128 has a reflectivity of 90% or more for the radiation emitted by the active layer 112, for example, 95% or more, and may contain, for example, a first reflective stack including multiple pairs of alternately stacked layers made of $SiO_2$ and layers made of $Ta_2O_5$ and may further include a first-end layer made of $Al_2O_3$ and a second-end layer made of $SiO_2$ disposed on both sides of the first reflective stack, respectively. During operation of the light-emitting device 100-1, the light generated from the active layer 112 can resonate between the low-reflective layer 126 and the high-reflective layer 128, and then emitted out of the light-emitting device 100-1 through the low-reflective layer 126.

Figure 3:
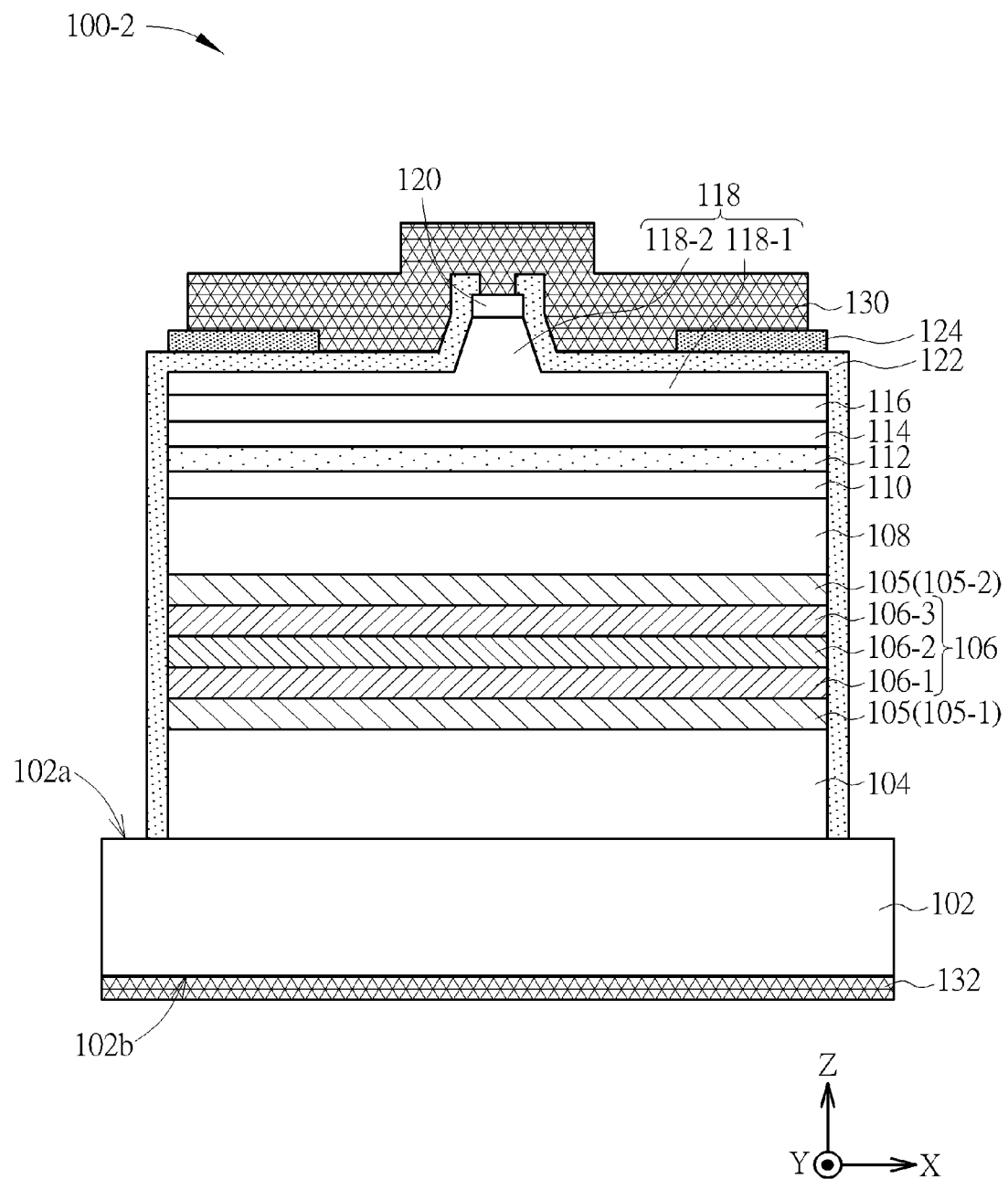
FIG. 3 is a schematic cross-sectional view of a light-emitting device according to some embodiments of the present disclosure.

FIG. 3 is a schematic cross-sectional view of a light-emitting device according to some embodiments of the present disclosure. Referring to FIG. 3, the main difference between the light-emitting device 100-2 and the light-emitting device 100-1 is that an intermediate structure 105 is disposed abutting the first aluminum-containing semiconductor layer 104 and/or the second aluminum-containing semiconductor layer 108, and the composition of the intermediate structure 105 is $In_{a6}Al_{b6}Ga_{1-a6-b6}N$ (0≤a6<a1, 0<b6≤b1, and a6+b6<1). In an embodiment, the intermediate structure 105 contains GaN. Since the lattice constant of the intermediate structure 105 is greater than that of first aluminum-containing semiconductor layer 104 and the second aluminum-containing semiconductor layer 108, but less than that of the first indium-containing semiconductor layer 106-1, the stress and/or strain accumulated in the first semiconductor layer 110 can be further reduced. In some embodiments, the intermediate structure 105 can include a first intermediate layer 105-1 and/or a second intermediate layer 105-2 disposed below and above the stack structure 106, respectively. The first intermediate layer 105-1 is disposed between the first aluminum-containing semiconductor layer 104 and the first indium-containing semiconductor layer 106-1, and the thickness of the first intermediate layer 105-1 is less than the thickness of the first indium-containing semiconductor layer 106-1. The second intermediate layer 105-2 is disposed between the third indium-containing semiconductor layer 106-3 and the second aluminum-containing semiconductor layer 108, and the thickness of the second intermediate layer 105-2 is less than the thickness of the third indium-containing semiconductor layer 106-3. The first intermediate layer 105-1 and/or the second intermediate layer 105-2 includes a thickness between 0.5 nm and 50 nm, for example, between 1 nm and 30 nm.

In order to enable one of ordinary skill in the art to implement the invention described in the present disclosure, the method of manufacturing a light-emitting device of the present disclosure is described in detail below.

Figure 4:
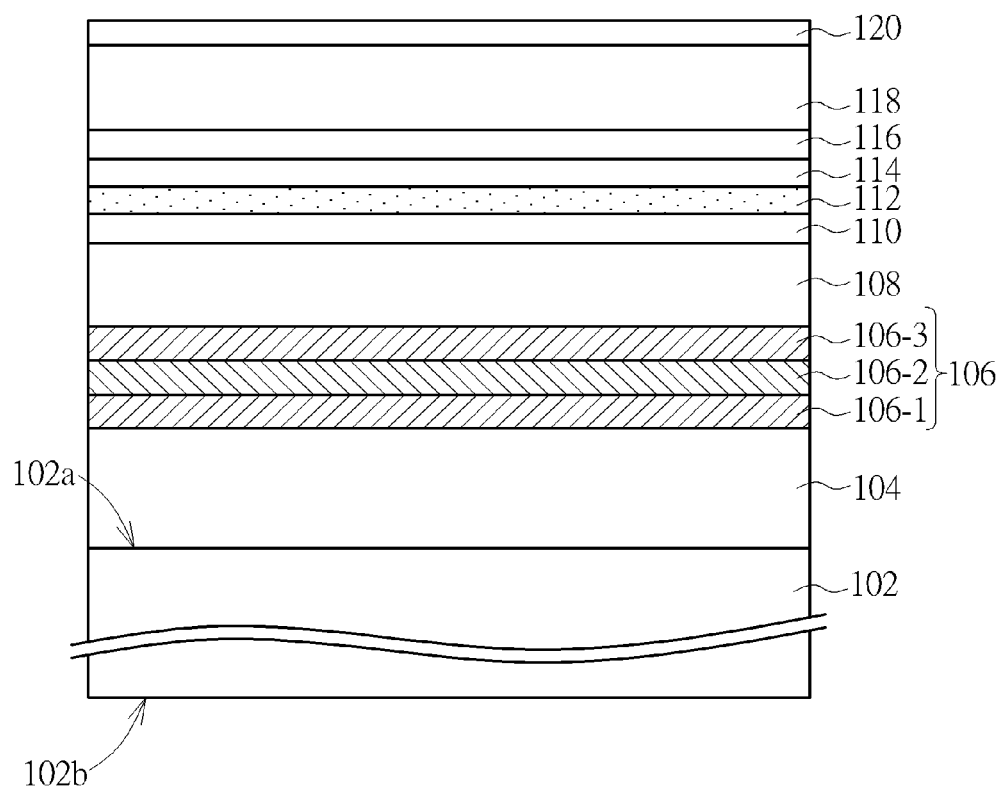
FIGS. 4-7 are schematic cross-sectional views of a method of manufacturing a light-emitting device according to some embodiments of the present disclosure.

FIGS. 4-7 are schematic cross-sectional views of a method of manufacturing a light-emitting device according to some embodiments of the present disclosure. FIG. 4 is a schematic cross-sectional view at a manufacturing stage of a method of manufacturing a light-emitting device. Referring to FIG. 4, a substrate 102 is shown in a cross-sectional view 200-1. In some embodiments, the substrate 102 is, for example, a nitride semiconductor substrate, a silicon carbide substrate, or a gallium arsenide substrate. When the substrate 102 is the nitride semiconductor substrate, the substrate 102 can contain gallium nitride (GaN) or other suitable materials, as represented by $In_xAl_yGa_{1-x-y}N$ (0≤x, 0≤y, 0≤x+y≤1). The first surface 102a of the substrate 102 includes a (0001) plane, a (000-1) plane, a (10-10) plane, a (11-20) plane, a (10-14) plane, a (10-15) plane, or a (11-24) plane. The thickness of the substrate 102 may be greater than 500 m, such as 1 mm.

Several epitaxial semiconductor layers can be stacked on the first surface 102a of the substrate 102 by epitaxy processes. Depending on various design needs, some of the stacked epitaxial layers can have the thicknesses, conductivity types, compositions, dopants, and/or refractive indexes the same as or different from others of the stacked epitaxial layers. For n-type epitaxial semiconductor layers that contain n-type dopants, the n-type dopants contained therein can be Si, C, Ge, Sn, Pb, O, or a combination thereof. For p-type epitaxial semiconductor layers that contain p-type dopants, the p-type dopants contained therein can be Mg, Li, Na, K, Be, Zn, Ca, or a combination thereof.

In some embodiments, a first aluminum-containing semiconductor layer 104 is nitride semiconductor layer with n-type dopants, as represented by $In_xAl_yGa_{1-x-y}N$ (0≤x, 0≤y, 0≤x+y≤1), for example, x=0, y=0.01~0.05. The lattice constant of the first aluminum-containing semiconductor layer 104 can be less than that of the substrate 102, and the thickness of the first aluminum-containing semiconductor layer 104 can be greater than the thickness of the overlying stack structure 106, such as greater than 700 nm, but lower than 1500 nm.

In some embodiments, the stack structure 106 is stacked on the first aluminum-containing semiconductor layer 104. The stack structure 106 can include a first indium-containing semiconductor layer 106-1, a second indium-containing semiconductor layer 106-2, and a third indium-containing semiconductor layer 106-3. Each sub-layer in the stack structure 106 is nitride semiconductor layer with n-type dopants, as represented by $In_xAl_yGa_{1-x-y}N$ (0≤x, 0<y, 0<x+y≤1), for example, x=0.002~0.2, y=0. The lattice constant of each layer in stack structure 106 can be greater than that of the substrate 102. Besides, the thickness of the second indium-containing semiconductor layer 106-2 can be greater than the thickness of each of the first indium-containing semiconductor layer 106-1 and the third indium-containing semiconductor layer 106-3.

The amount of the epitaxial defects formed in the stack structure 106 is more than that in the first aluminum-containing semiconductor layer 104 and that in the second aluminum-containing semiconductor layer 108. The first indium-containing semiconductor layer 106-1, the second indium-containing semiconductor layer 106-2, and the third indium-containing semiconductor layer 106-3 include n-type dopants and the dopant concentrations of the first indium-containing semiconductor layer 106-1, the second indium-containing semiconductor layer 106-2, and the third indium-containing semiconductor layer 106-3 are 2-4 times larger than that of the first aluminum-containing semiconductor layer 104 and that of the second aluminum-containing semiconductor layer 108 to reduce the sheet resistance of the stack structure 106 for better current spreading capability.

In some embodiments, the second aluminum-containing semiconductor layer 108 is nitride semiconductor layer with n-type dopants, as represented by $In_xAl_yGa_{1-x-y}N$ ($0 \leq x$, $0 < y$, $0 < x+y \leq 1$), for example, x=0, y=0.04~0.07. The lattice constant of the second aluminum-containing semiconductor layer 108 can be less than that of the first aluminum-containing semiconductor layer 104, and the thickness of the second aluminum-containing semiconductor layer 104 can be greater than the thickness of the underlying stack structure 106, such as greater than 700 nm, but lower than 1500 nm.

In some embodiments, the first semiconductor layer 110 and the second semiconductor layer 114 are nitride semiconductor layers and have gradient compositions. The first semiconductor layer 110 can include n-type dopants, but the second semiconductor layer 114 does not include intentionally-doped p-type dopants. The indium composition ratios in the first semiconductor layer 110 and the second semiconductor layer 114 both decrease along a direction away from the active layer 112, and the maximum indium composition ratios of the first and second composition gradient layers are not larger than 0.08, for example, not larger than 0.05. In this way, the refractive index of the first semiconductor layer 110 can be increased along Z direction, and the refractive index of the second semiconductor layer 114 can be decreased along Z direction. Besides, the thicknesses of the first semiconductor layer 110 and the second semiconductor layer 114 are respectively greater than the thickness of the stack structure 106.

In some embodiments, the active layer 112 can be a structure including a multiple quantum well. The active layer 112 may be a group III-V binary compound semiconductor such as indium phosphide (InP), gallium phosphide (GaP) or gallium nitride (GaN), a group III-V ternary or quaternary compound semiconductor such as gallium arsenide (GaAsP), aluminum gallium arsenide (AlGaAs), indium gallium nitride (InGaN), aluminum gallium nitride (AlGaN), aluminum indium gallium nitride (AlInGaN), aluminum gallium indium phosphide (AlGaInP), or aluminum indium gallium arsenide (AlInGaAs), or group II-VI binary compound semiconductor such as cadmium selenide (CdSe), cadmium sulfide (CdS) or zinc selenide (ZnSe), but not limited thereto.

In some embodiments, an electron blocking layer (EBL) 116, a third aluminum-containing semiconductor layer 118, and a contact layer 120 disposed on the second semiconductor layer 114 are nitride semiconductor layers with p-type dopants. The overall thickness of the electron blocking layer 116, the third aluminum-containing semiconductor layer 118, and the contact layer 120 is less than the second semiconductor layer 114.

Figure 5:
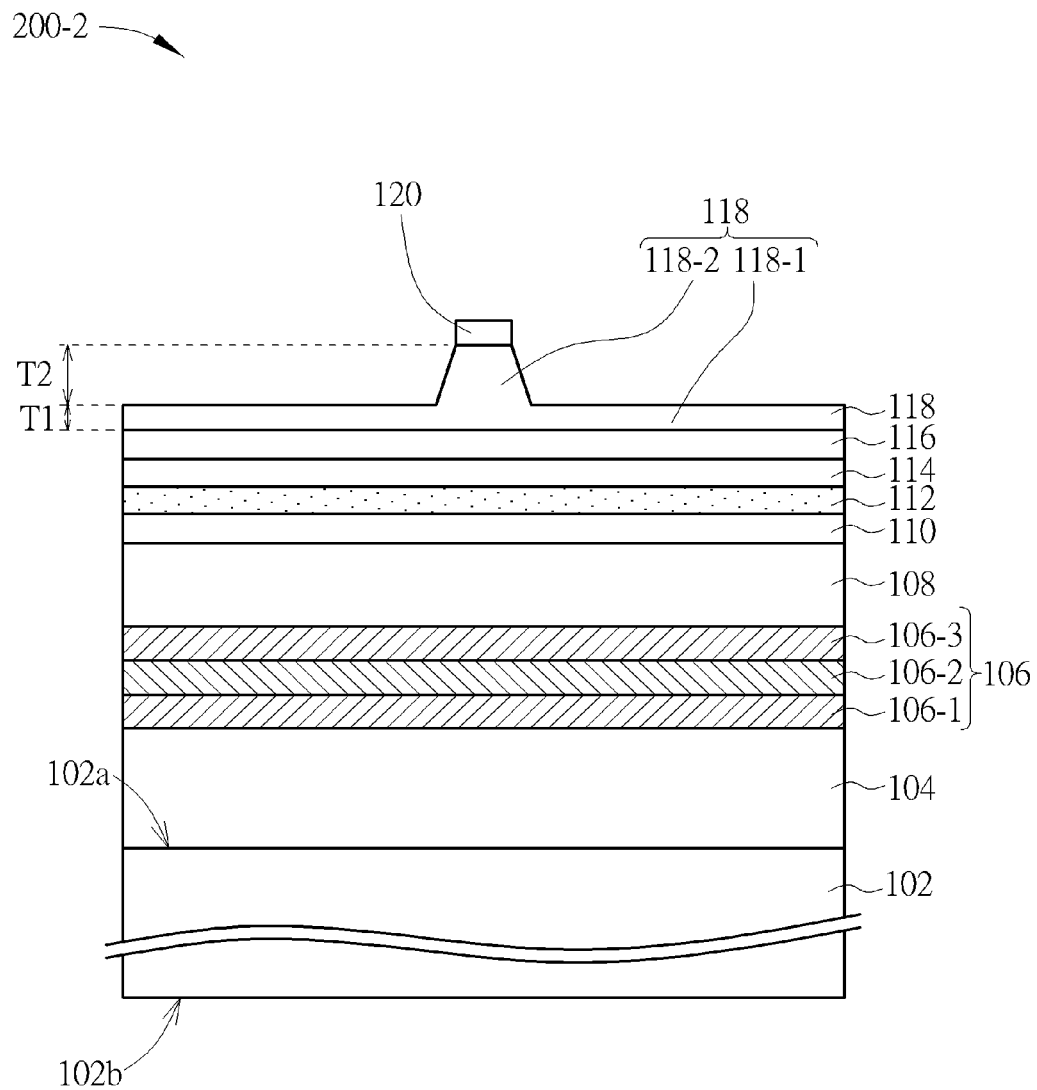

FIG. 5 is a schematic cross-sectional view at a manufacturing stage subsequent to the manufacturing stage of FIG. 4. Referring to a cross-sectional view 200-2 of FIG. 5, a photolithography process and an etching process can be applied to pattern the contact layer 120 and the third aluminum-containing semiconductor layer 118. Thus, the third aluminum-containing semiconductor layer 118 can be patterned to have a film portion 118-1 and a ridge-shaped portion 118-2. The thickness T1 of the film portion 118-1 can be 50% to 20% of the thickness T2 of the ridge-shaped portion 118-2. By properly controlling the thickness ratio of the film portion 118-1 to the ridge-shaped portion 118-2, the output power with optimum conversion efficiency can be generated accordingly.

Figure 6:
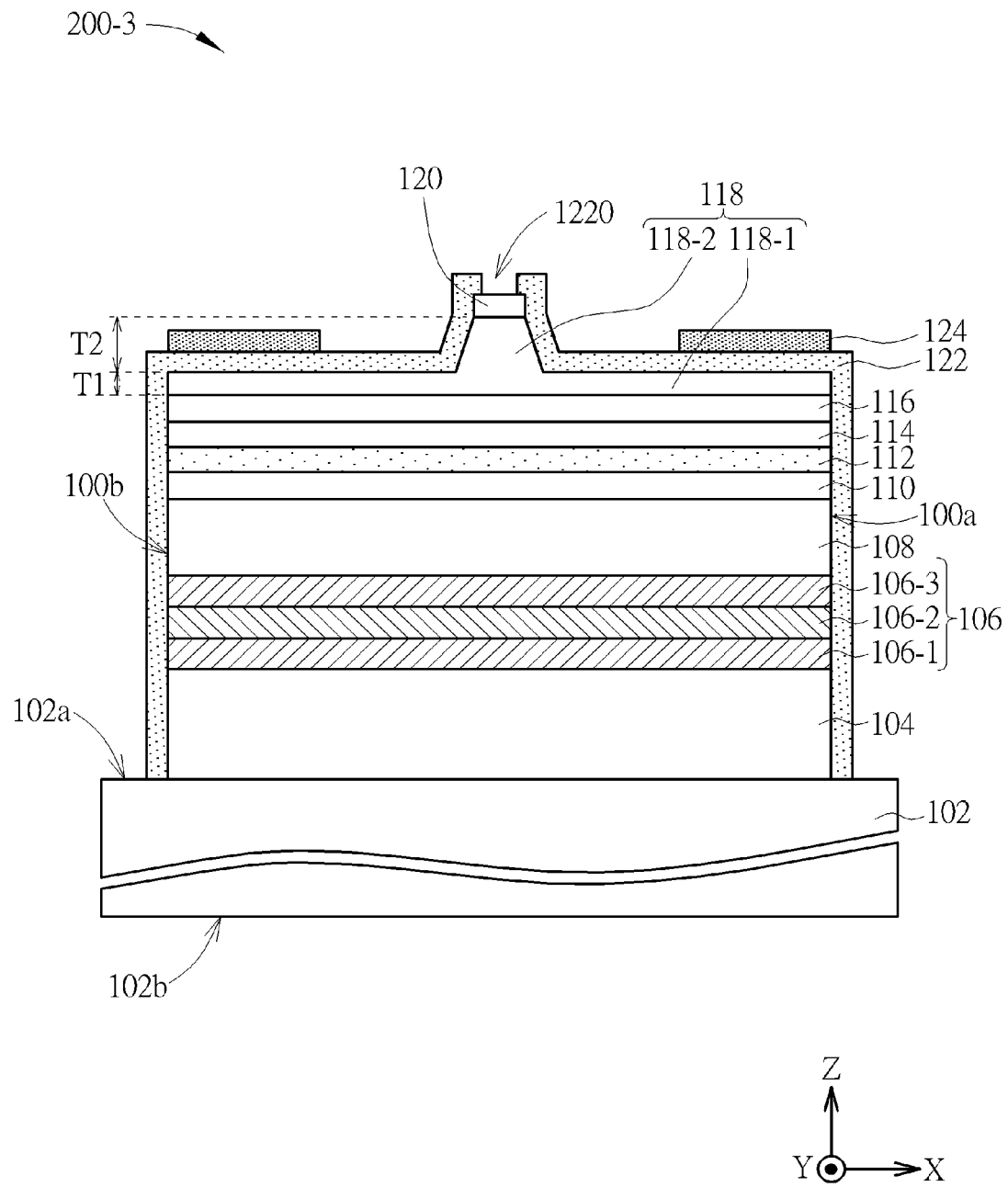

FIG. 6 is a schematic cross-sectional view at a manufacturing stage subsequent to the manufacturing stage of FIG. 5. Referring to a cross-sectional view 200-3 of FIG. 6, an isolation region is formed along the Y-direction by removing a portion of the stacked layers above the substrate 102 and expose a portion surface of the substrate 102. Then, a first insulating layer 122 can be formed to cover the top surface and sidewalls of the stacked layers disposed on the substrate 102. An opening 122O can be formed in the first insulating layer 122 to expose a portion of the contact layer 120. Besides, a second insulating layer 124 includes two portions separated by the ridge-shaped portion 118-2. The two portions of the second insulating layer 124 are respectively formed on the first insulating layer 122 at two opposite sides of the ridge-shaped portion 118-2. The first insulating layer 122 and the second insulating layer 124 can include the same or different material, such as oxide, nitride, and oxynitride of silicon (Si), zirconium (Zr), aluminum (Al) or tantalum (Ta), or other suitable insulating materials. Besides, a transparent conductive layer (not shown) can be formed on the contact layer 120 and partially covered with the first insulating layer 122. The material of the conductive layer may include indium tin oxide (ITO), zinc oxide (ZnO), zinc indium tin oxide (ZITO), zinc indium oxide (ZIO), zinc tin oxide (ZTO), gallium indium tin oxide (GITO), gallium indium oxide (GIO), gallium zinc oxide (GZO), aluminum doped zinc oxide (AZO), fluorine tin oxide (FTO), or other suitable transparent conductive oxides, or include a transparent metal layer, such as Al, Ni, Au with a thickness of less than 500 Angstroms.

Figure 7:
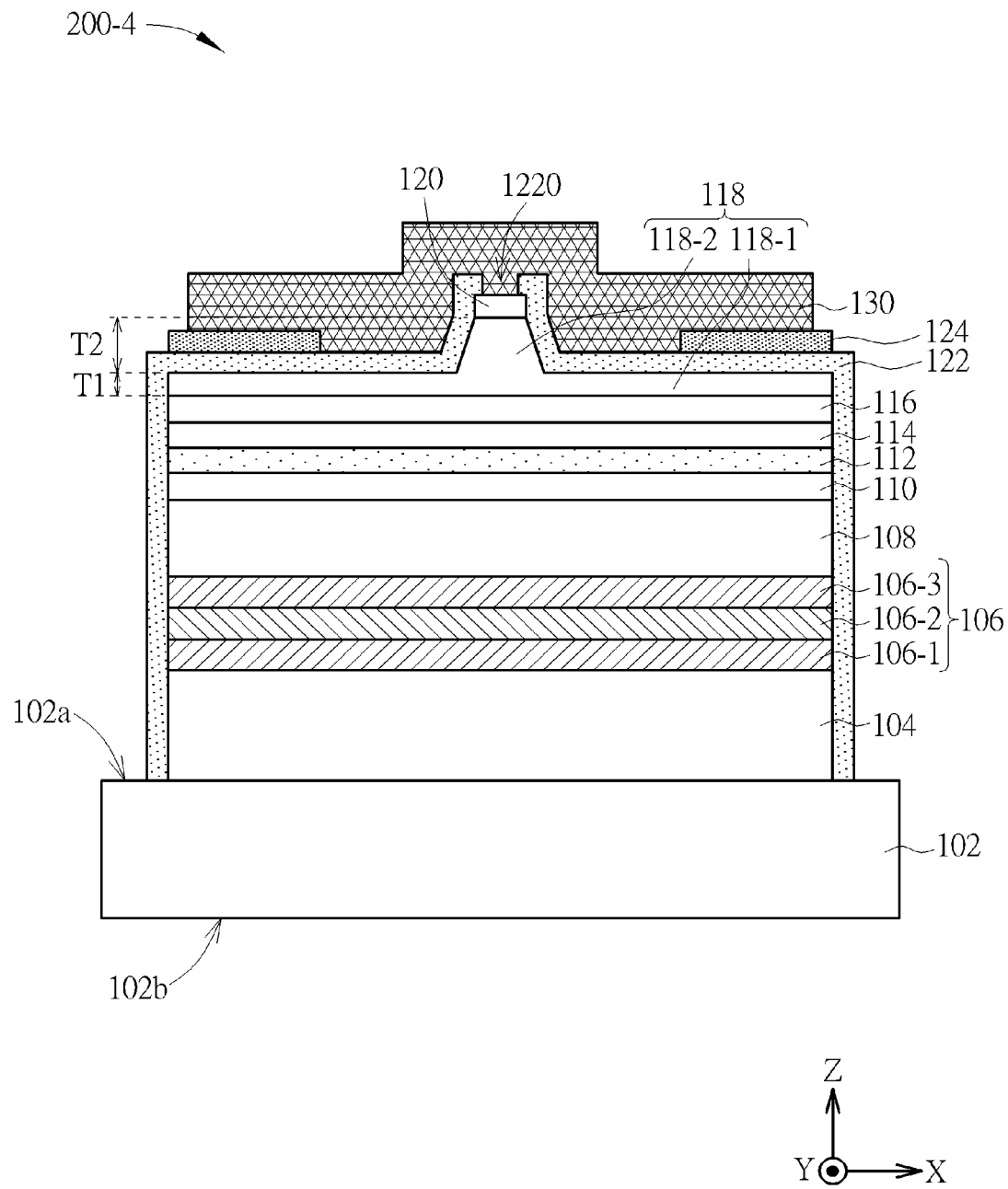

FIG. 7 is a schematic cross-sectional view at a manufacturing stage subsequent to the manufacturing stage of FIG. 6. Referring to a cross-sectional view 200-4 of FIG. 7, a second electrode 130 can be formed on the second insulating layer 124 and electrically coupled to the contact layer 120. The material of the second electrode 130 may include chromium (Cr), aluminum (Al), palladium (Pd), platinum (Pt), nickel (Ni), gold (Au), titanium (Ti), tungsten (W), a combination thereof, or other suitable conductive materials. Then, a lapping process can be performed on the second surface 102b of the substrate 102 to thereby thin the substrate 102 until a required thickness, such as 50 μm to 500 μm, is reached.

Afterwards, the second surface 102b of the substrate 102 can be texturized to increase the roughness of the second surface 102b, and then a first electrode (not shown) can be formed on the second surface 102b. The material of the first electrode formed on the second surface 102b can include Pd, Cr, Ti, Al, Au, Pt, a combination thereof, or other suitable conductive materials. Subsequently, a first cleaving process can be performed on the substrate 102 along the X-direction of FIG. 7 to separate the device shown in FIG. 7 into a plurality of bar structures each of which has a rear side and a front side. Then, the low-reflective layer 126 and the high-reflective layer 128 illustrated in FIG. 2 are respectively formed on the rear side and the front side (i.e. the side along the Y-direction of FIG. 7) of the semiconductor layers. Finally, a second cleaving process can be performed along the isolation region of each of the bar structures to separate each of the bar structures into a plurality of light-emitting devices shown in FIG. 1.

Figure 8:
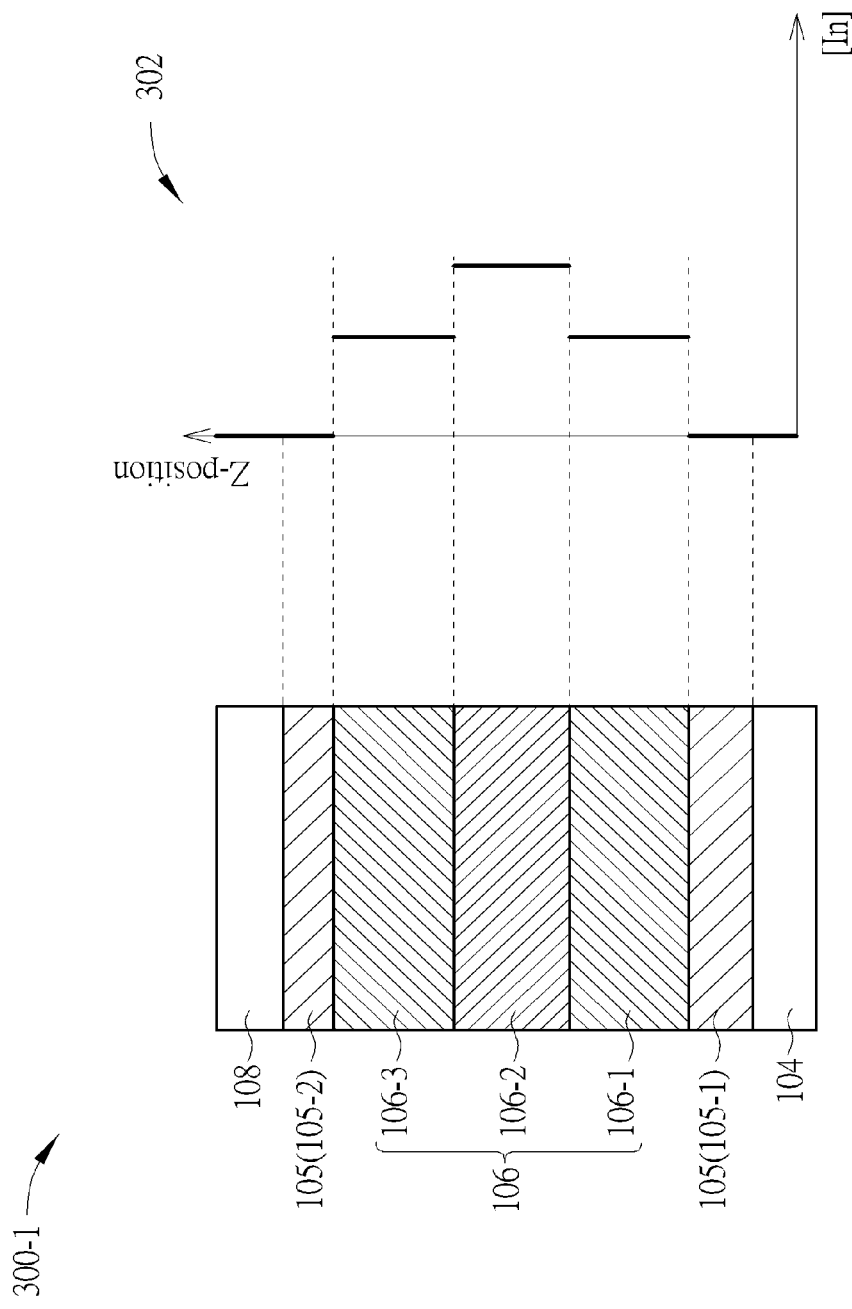
FIG. 8 is a schematic diagram illustrating a concentration profile of indium with respect to different z-positions according to some embodiments of the present disclosure.

FIG. 8 is schematic diagram illustrating a concentration profile of indium with respect to different Z-positions according to some embodiments of the present disclosure. Referring to FIG. 8, the relationship between a layered structure 300-1 of a light-emitting device and the corresponding concentration profile 302 is shown. The layered structure 300-1 includes the first aluminum-containing layer 104, the first intermediate layer 105-1, the first, second, third indium-containing semiconductor layers 106-1, 106-2, 106-3, the second intermediate layer 105-2, and the second aluminum-containing layer 108 stacked in sequence. Regarding the concentration profile 302, the concentration profile of indium includes several discontinuous sections respectively at interfaces of adjacent layers among the first intermediate layer 105-1, the first, second, third indium-containing semiconductor layers 106-1, 106-2, 106-3, and the second intermediate layer 105-2. For example, there is a concentration discontinuity at an interface between the first indium-containing semiconductor layer 106-1 and the second indium-containing semiconductor layer 106-2, and there is a concentration discontinuity at an interface between the second indium-containing semiconductor layer 106-2 and the third indium-containing semiconductor layer 106-3.

Figure 9:
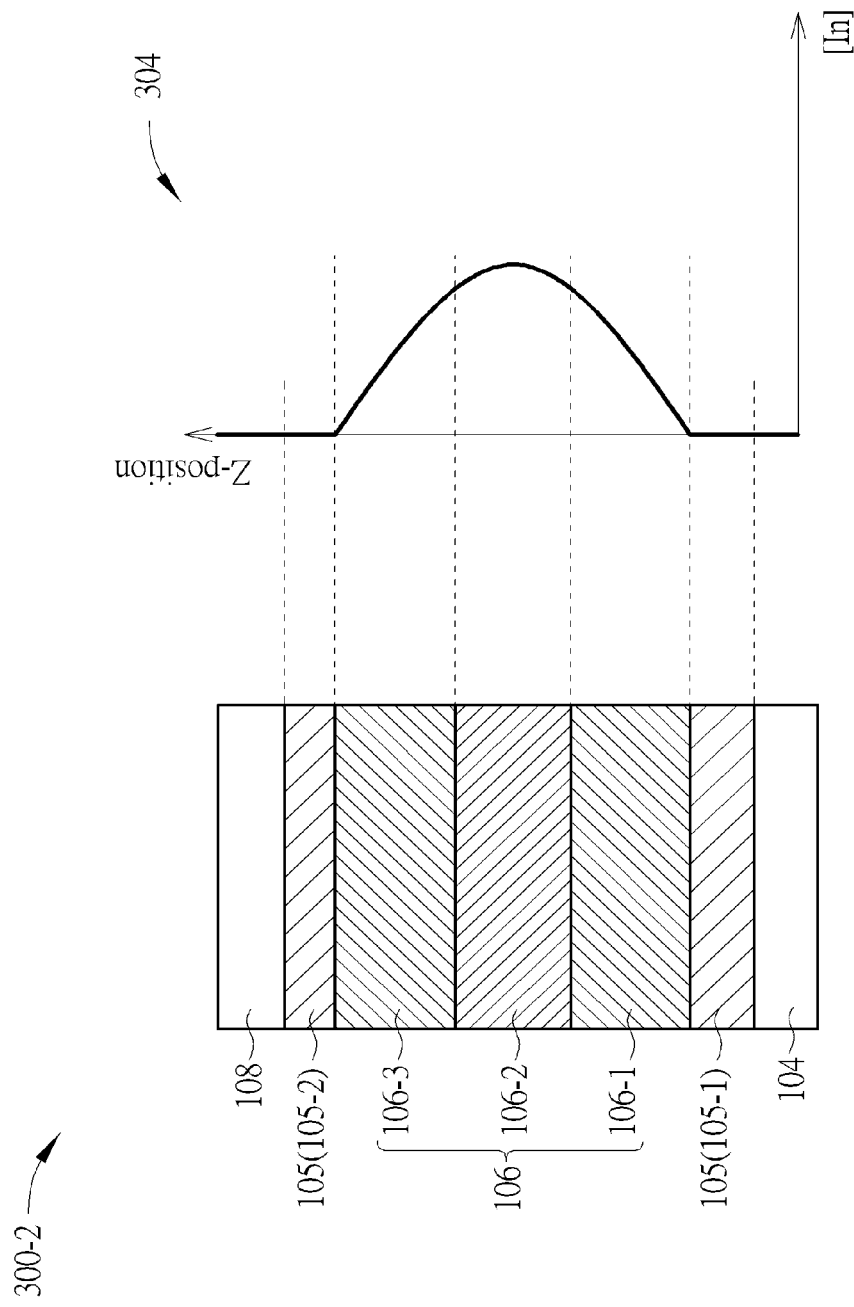
FIG. 9 is a schematic diagram illustrating a concentration profile of indium with respect to different z-positions according to some embodiments of the present disclosure.

FIG. 9 is schematic diagram illustrating a concentration profile of indium with respect to different Z-positions according to some embodiments of the present disclosure. Referring to FIG. 9, the relationship between a layered structure 300-2 of a light-emitting device and the corresponding concentration profile 304 is shown. The layered structure 300-2 includes the first aluminum-containing layer 104, the first intermediate layer 105-1, the first, second, third indium-containing semiconductor layers 106-1, 106-2, 106-3, the second intermediate layer 105-2, and the second aluminum-containing layer 108 stacked in sequence. Regarding the concentration profile 304, the concentration profile of indium is continuously grading, which includes several continuously-grading sections respectively across interfaces of adjacent layers among the first, second, third indium-containing semiconductor layers 106-1, 106-2, 106-3. For example, the concentration of indium is gradually increased from the bottom of the first indium-containing semiconductor layer 106-1 to the core of the second indium-containing semiconductor layer 106-2 and gradually decreased from the core of the second indium-containing semiconductor layer 106-2 to the top of the third indium-containing semiconductor layer 106-3.

Figure 10:
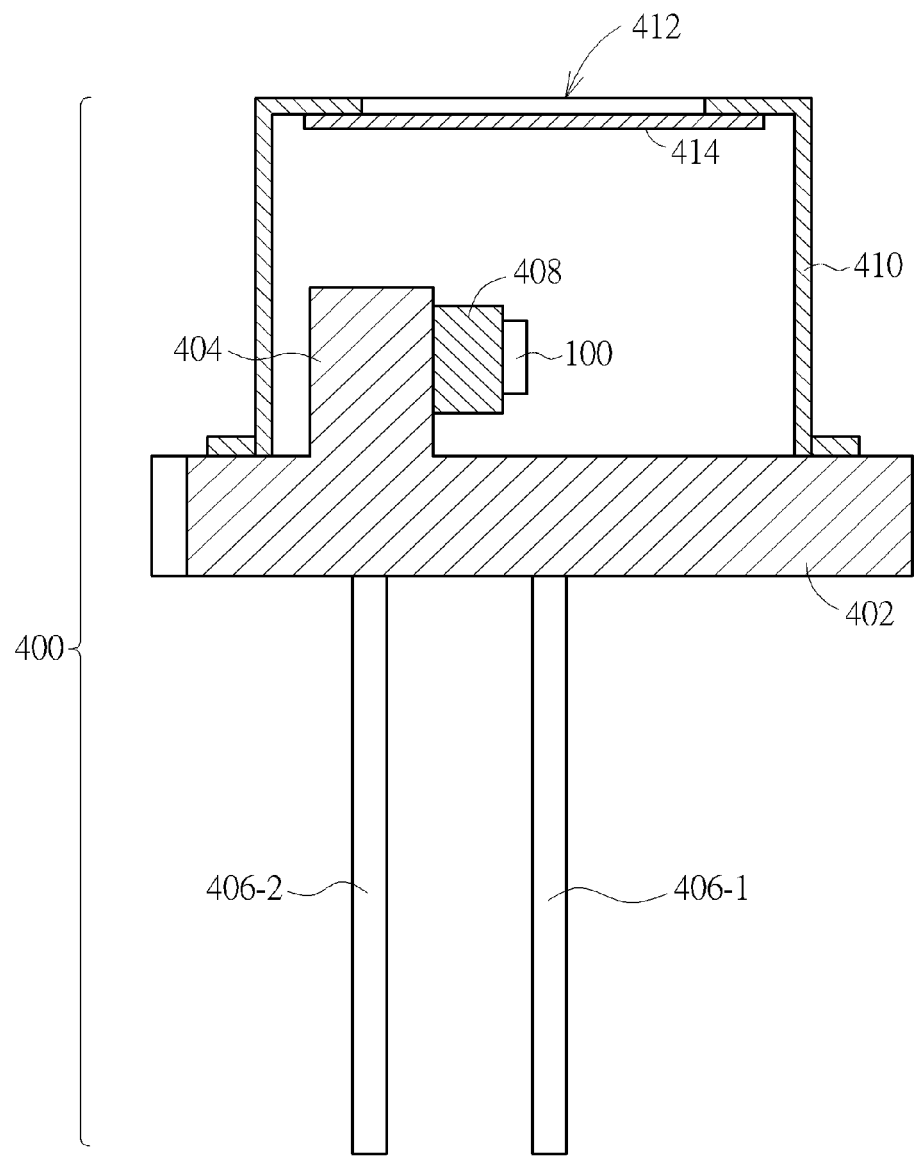
FIG. 10 is a schematic cross-sectional view of a light source unit including a light-emitting device according to some embodiments of the present disclosure.

FIG. 10 is schematic cross-sectional view of a light source unit including a light-emitting device according to some embodiments of the present disclosure. Referring to FIG. 10, a light source unit 400 includes a heat sink 402, a first lead 406-1, a second lead 406-2, a support base 404, a sub-mount 408, a laser diode chip 100 and a metal cover 410. The first lead 406-1 and the second lead 406-2 are disposed on the back of the heat sink 402. The support base 404 is protruded from the surface of the heat sink 402 and coupled to the ground (GND) second lead 406-2. The sub-mount 408 is disposed between the support base 404 and the light-emitting device 100 so as to bond the laser diode chip 100 to the support base 404. The metal cover 410 further includes an opening 412 and a cover glass 414 covering the opening 412, and the bottom edge of the metal cover 410 is attached to the heat sink 402. The laser diode chip 100 can include the light-emitting device according to any embodiments of the present disclosure, but is not limited thereto. During the operation of the light source unit 400, radiation can be emitted upwardly from the edge of the laser diode chip 100 (or from one side surface of the active layer), and then the radiation can pass through the opening 412 of the metal cover 410.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A light-emitting device, comprising:
  a substrate;
  a first semiconductor layer and a second semiconductor layer, disposed on the substrate;
  an active layer, disposed between the first semiconductor layer and the second semiconductor layer;
  a first aluminum-containing semiconductor layer, disposed between the substrate and the first semiconductor layer, wherein a first aluminum composition ratio of the first aluminum-containing semiconductor layer is greater than an aluminum composition ratio of the first semiconductor layer;
  a second aluminum-containing semiconductor layer, disposed between the first aluminum-containing semiconductor layer and the first semiconductor layer, wherein a second aluminum composition ratio of the second aluminum-containing semiconductor layer is greater than the aluminum composition ratio of the first semiconductor layer; and
  a stack structure, disposed between the first aluminum-containing semiconductor layer and the second aluminum-containing semiconductor layer, and the stack structure comprising:
  a first indium-containing semiconductor layer, comprising $In_{a1}Al_{b1}Ga_{1-a1-b1}N$ ($0<a1+b1<1$);
  a second indium-containing semiconductor layer, disposed on the first indium-containing semiconductor layer and comprising $In_{a2}Al_{b2}Ga_{1-a2-b2}N$ ($0<a2+b2<1$); and
  a third indium-containing semiconductor layer, disposed on the first indium-containing semiconductor layer and comprising $In_{a3}Al_{b3}Ga_{1-a3-b3}N$ ($0<a3+b3<1$), and $0<a3 \le a1<a2$ or $0<a1 \le a3<a2$.

2. The light-emitting device of claim 1, wherein a second thickness of the second indium-containing semiconductor layer is respectively greater than a first thickness of the first indium-containing semiconductor layer and a third thickness of the third indium-containing semiconductor layer.

3. The light-emitting device of claim 2, wherein the second thickness of the second indium-containing semiconductor layer is 4-10 times greater than the first thickness of the first indium-containing semiconductor layer and the third thickness of the third indium-containing semiconductor layer.

4. The light-emitting device of claim 1, wherein a2 satisfies $0.01<a2<0.05$.

5. The light-emitting device of claim 1, wherein the first aluminum-containing semiconductor layer, the stack structure, and the second aluminum-containing semiconductor layer all have n-type conductivity.

6. The light-emitting device of claim 1, wherein a thickness of the stack structure is respectively less than a thickness of the first aluminum-containing semiconductor layer and a thickness of the second aluminum-containing semiconductor layer.

7. The light-emitting device of claim 1, wherein the first aluminum-containing semiconductor layer generates tensile stress to the substrate, and the stack structure generates compressive stress to the substrate.

8. The light-emitting device of claim 1, wherein a lattice constant of the second indium-containing semiconductor layer is respectively greater than a lattice constant of the first aluminum-containing semiconductor and a lattice constant of the second aluminum-containing semiconductor.

9. The light-emitting device of claim 1, wherein a lattice constant of the second indium-containing semiconductor layer is respectively greater than a lattice constant of the first indium-containing semiconductor layer and a lattice constant of the third indium-containing semiconductor layer.

10. The light-emitting device of claim 1, wherein a lattice constant of the second indium-containing semiconductor layer is greater than a lattice constant of the substrate.

11. The light-emitting device of claim 1, wherein the stack structure comprises a concentration profile of indium, and the concentration profile of indium comprises discontinuous sections respectively at an interface of the first indium-containing semiconductor layer and the second indium-containing semiconductor layer and at an interface of the second indium-containing semiconductor layer and the third indium-containing semiconductor layer.

12. The light-emitting device of claim 1, wherein the stack structure comprises a concentration profile of indium, and the concentration profile of indium comprises continuously-grading sections respectively across an interface of the first indium-containing semiconductor layer and the second indium-containing semiconductor layer and across an interface of the second indium-containing semiconductor layer and the third indium-containing semiconductor layer.

13. The light-emitting device of claim 1, wherein the stack structure further comprises a fourth indium-containing semiconductor layer, comprising $In_{a4}Al_{b4}Ga_{1-a4-b4}N$ ($0<a4+b4<1$) disposed between the first indium-containing semiconductor layer and the second indium-containing semiconductor layer, wherein a thickness of the fourth indium-containing semiconductor layer is between thicknesses of the first and second indium-containing semiconductor layers, and $a1<a4<a2$.

14. The light-emitting device of claim 1, wherein the stack structure further comprises a fifth indium-containing semiconductor layer, comprising $In_{a5}Al_{b5}Ga_{1-a5-b5}N$ ($0<a5+b5<1$) disposed between the second indium-containing semiconductor layer and the third indium-containing semiconductor layer, wherein a thickness of the fifth indium-containing semiconductor layer is between thicknesses of the second and third indium-containing semiconductor layers, and $a3<a5<a2$.

15. The light-emitting device of claim 1, wherein the stack structure further comprises an intermediate structure disposed abutting the first aluminum-containing semiconductor layer and/or the second aluminum-containing semiconductor layer and comprising $In_{a6}Al_{b6}Ga_{1-a6-b6}N$ ($0 \leq a6 < a1$, $0 \leq b6 < b1$, and $a6+b6<1$).

16. The light-emitting device of claim 15, wherein the intermediate structure comprises:
a first intermediate layer, disposed between the first aluminum-containing semiconductor layer and the first indium-containing semiconductor layer, wherein a thickness of the first intermediate layer is less than a thickness of the first indium-containing semiconductor layer; or
a second intermediate layer, disposed between the third indium-containing semiconductor layer and the second aluminum-containing semiconductor layer, wherein a thickness of the second intermediate layer is less than a thickness of the third indium-containing semiconductor layer.

17. The light-emitting device of claim 1, wherein indium composition ratios of the first and second semiconductor layers decrease along a direction away from the active layer.

18. The light-emitting device of claim 17, wherein maximum indium composition ratios of the first and second semiconductor layers are not larger than 0.05 respectively.

19. The light-emitting device of claim 17, wherein thicknesses of the first semiconductor layer and the second semiconductor layer are respectively greater than a thickness of the stack structure.

20. The light-emitting device of claim 1, further comprising a third aluminum-containing semiconductor layer disposed on the second semiconductor layer, wherein the third aluminum-containing semiconductor layer comprises a ridge-shaped portion and a film portion disposed at two sides of the ridge-shaped portion.

* * * * *